(12) United States Patent
Worth et al.

(10) Patent No.: US 12,535,452 B2
(45) Date of Patent: Jan. 27, 2026

(54) MOISTURE REGULATING ELECTROCHEMICAL SENSORS FOR LOW AND HIGH HUMIDITY ENVIRONMENTS

(71) Applicant: ACRULOG PTY. LTD., Clontarf (AU)

(72) Inventors: Brian Worth, Woody Point (AU); Rhen Worth, Boondall (AU)

( * ) Notice: Subject to any disclaimer, the term of this patent is extended or adjusted under 35 U.S.C. 154(b) by 460 days.

(21) Appl. No.: 17/963,563

(22) Filed: Oct. 11, 2022

(65) Prior Publication Data
US 2023/0120802 A1  Apr. 20, 2023

Related U.S. Application Data

(60) Provisional application No. 63/262,510, filed on Oct. 14, 2021.

(51) Int. Cl.
*G01N 27/40* (2006.01)
*G01N 27/404* (2006.01)
*G01N 27/413* (2006.01)

(52) U.S. Cl.
CPC ......... *G01N 27/4045* (2013.01); *G01N 27/40* (2013.01); *G01N 27/413* (2013.01)

(58) Field of Classification Search
CPC .. G01N 27/4045; G01N 27/40; G01N 27/413; G01N 27/404; G01N 33/006;
(Continued)

(56) References Cited

U.S. PATENT DOCUMENTS

| | | | |
|---|---|---|---|
| 2005/0241938 A1* | 11/2005 | Aldridge | G01N 27/404 204/431 |
| 2009/0057150 A1* | 3/2009 | Millar | G01N 27/404 204/432 |

(Continued)

FOREIGN PATENT DOCUMENTS

| | | |
|---|---|---|
| EP | 0762117 A2 | 3/1997 |
| JP | 2011158468 A | 8/2011 |

OTHER PUBLICATIONS

Forms PCT/ISA/220 and PCT/ISA/210 International Search Report, Form PCT/ISA/237 Written Opinion of the International Searching Authority, and Search Information Statement, all of the International Searching Authority of International Patent Application No. PCT/IB2023/00539, dated Nov. 30, 2023.

*Primary Examiner* — Luan V Van
*Assistant Examiner* — Kaylee Tseng
(74) *Attorney, Agent, or Firm* — Parsons & Goltry, PLLC; Michael W. Goltry; Robert A. Parsons

(57) ABSTRACT

A moisture regulating electrochemical sensor includes a sensor electrolyte housed in a chamber of a casing configured with electrodes connected electrically to the sensor electrolyte and configured to be connected electrically to an exterior circuit, an inlet, a vent, and a membrane permeable only to moisture, the chamber between the inlet and the vent each to the sensor electrolyte in the chamber, the inlet allowing a target gas to pass through from an exterior target gas environment to the sensor electrolyte in the chamber, and the membrane operatively coupled to the vent, allowing only moisture to translate through the vent between an exterior vent environment and the sensor electrolyte in the chamber.

27 Claims, 10 Drawing Sheets

(58) Field of Classification Search
CPC ........ G01N 27/26; B01D 71/36; B01D 71/82; B01D 2053/221
See application file for complete search history.

(56) References Cited

U.S. PATENT DOCUMENTS

| | | | |
|---|---|---|---|
| 2012/0228139 A1* | 9/2012 | Mitchell | G01N 27/404 |
| | | | 204/431 |
| 2013/0062223 A1* | 3/2013 | Rabbett | G01N 27/4045 |
| | | | 29/595 |
| 2013/0153442 A1* | 6/2013 | Chen | G01N 27/407 |
| | | | 205/789 |
| 2017/0276634 A1* | 9/2017 | Saffell | G01N 27/40 |
| 2019/0137440 A1* | 5/2019 | Beck | G01N 27/4045 |
| 2020/0209183 A1* | 7/2020 | Jian | G01N 33/0009 |

* cited by examiner

MOISTURE REGULATING ELECTROCHEMICAL SENSORS FOR LOW AND HIGH HUMIDITY ENVIRONMENTS

CROSS-REFERENCE TO RELATED APPLICATION

This application claims the benefit of U.S. Provisional Patent Application No. 63/262,510, filed Oct. 14, 2021, incorporated herein by reference.

SUMMARY OF THE INVENTION

The present invention relates to electrochemical sensors.

BACKGROUND OF THE INVENTION

Wastewater facilities, chemical treatment plants, pharmaceutical facilities, and other industrial plants generate and often inadvertently release hazardous reactive compounds. Facilities like these usually deploy electrochemical sensors configured to sense certain reactive compounds to alert workers to their presence to enable timely implementation of remedial efforts to limit personnel and public exposure.

Existing electrochemical sensors have limited long-term effectiveness in high and low humidity environments. In high humidity environments, moisture uptake by the sensor's electrochemical solution dilutes it, causing its equilibrium relative humidity (ERH), its optimum moisture content that enables it to work at a nominal performance standard, to increase, and causing it to swell. Swelling of the electrochemical solution increases its volume, which can break the sensor or allow it to leak. In low humidity environments, loss of moisture from the electrochemical solution concentrates it decreasing its ERH, thereby changing the sensor's performance.

Accordingly, there is a need for electrochemical sensors for long-term use in low and high humidity environments configured to forestall moisture uptake by the sensor electrolyte in high humidity environments and dehydration of the sensor electrolyte in low humidity environments.

SUMMARY OF THE INVENTION

Disclosed are electrochemical sensors configured to sense the presence and concentrations of reactive compounds of a target gas from an exterior target gas environment using a sensor electrolyte, forestall moisture uptake by the sensor electrolyte in high humidity environments and dehydration of the sensor electrolyte in low humidity environments.

A

According to the principle of the invention, a moisture regulating electrochemical sensor includes a sensor electrolyte housed in a chamber of a casing configured with electrodes connected electrically to the sensor electrolyte and configured to be connected electrically to an exterior circuit, an inlet, a vent, and a membrane permeable only to moisture. The chamber is between the inlet and the vent each to the sensor electrolyte in the chamber. The inlet allows a target gas to pass through from an exterior target gas environment to the sensor electrolyte in the chamber. The membrane is operatively coupled to the vent, allowing only moisture to translate via the vent between an exterior vent environment and the sensor electrolyte in the chamber.

The membrane is carried by a carrier attached to the casing. The carrier extends radially outward over a surface of the casing from the membrane, and is sealed to the surface of the casing by an adhesive. In an exemplary embodiment, the membrane is outside the chamber and over the vent, the carrier is outside the chamber, and the surface of the casing is an exterior surface of the casing. The electrodes are each connected electrically to the sensor electrolyte by a lead and extend outwardly from the exterior surface of the casing and through and beyond an opening through the carrier.

The inlet is configured with a target gas flow controller configured to control a flow of the target gas to the inlet. The inlet includes a first size. The target gas flow controller includes a body including an inner surface, an outer surface, and an aperture extending through the body from the inner surface to the outer surface. The body extends radially outward over an exterior surface of the casing from the aperture registered with the inlet, and outward from the inner surface, sealed to the exterior surface of the casing by an adhesive, to the outer surface. The aperture includes a second size smaller than the first size of the inlet. The inlet, the vent, and the aperture are coaxial.

An exterior filter attached to the outer surface of the body extends over the aperture, is permeable to the target gas, and is configured to stop solid particulates carried by the target gas from passing through from the target gas environment to the aperture. The exterior filter extends radially outward over the outer surface of the body from the aperture to a continuous layer of adhesive, sealing the exterior filter to the outer surface of the body.

An interior filter in the chamber between the inlet and the sensor electrolyte is permeable to the target gas, and is configured to stop solid particulates carried by the target gas from passing through from the inlet to the sensor electrolyte. The interior filter is supported by a framework in the chamber. The framework is coupled between the interior filter and the casing, and the interior filter is open to the inlet through the framework.

The sensor electrolyte is carried by an absorbent medium housed in the chamber. The absorbent medium directly contacts the interior filter. The leads extend into the absorbent medium, electrically connecting the electrodes to the sensor electrolyte. In an exemplary embodiment, the absorbent medium is a wadding of cellulose.

B

According to the principle of the invention, a moisture regulating electrochemical sensor includes a sensor electrolyte and a humidifier housed in a first chamber and a second chamber, respectively, on either side of an intermediate wall, configured with an interior vent, of a casing configured with electrodes connected electrically to the sensor electrolyte and configured to be connected electrically to an exterior circuit, an inlet to the sensor electrolyte in the first chamber, a second vent to the humidifier in the second chamber, the first vent to the sensor electrolyte in the first chamber and the humidifier in the second chamber, and a first vent membrane and a second vent membrane each permeable only to moisture. The inlet allows a target gas to pass through from an exterior target gas environment to the sensor electrolyte in the first chamber. The first vent membrane is operatively coupled to the first vent, allowing only moisture to translate via the first vent between the sensor electrolyte in the first chamber and the humidifier in the second chamber. The second vent membrane is operatively coupled to the second vent, allowing only moisture to translate via the second vent between an exterior vent environment and the humidifier in the second chamber.

The first vent membrane is carried by a carrier attached to the intermediate wall. The carrier extends radially outward over a surface of the intermediate wall from the first vent membrane, and is sealed to the surface by an adhesive.

The second vent membrane is carried by a carrier attached to the casing. The carrier extends radially outward over a surface of the casing from the second vent membrane, and is sealed to the surface by an adhesive. In an exemplary embodiment, the second vent membrane is outside the second chamber and over the second vent, the carrier is outside the second chamber, the surface of the casing is an exterior surface of the casing. The electrodes are each connected electrically to the sensor electrolyte by a lead and extend outwardly from the exterior surface of the casing and through and beyond an opening through the carrier.

The inlet is configured with a target gas flow controller configured to control a flow of the target gas to the inlet. The inlet includes a first size. The target gas flow controller includes a body including an inner surface, an outer surface, and an aperture extending through the body from the inner surface to the outer surface. The body extends radially outward over an exterior surface of the casing from the aperture registered with the inlet, and outward from the inner surface, sealed to the exterior surface of the casing by an adhesive, to the outer surface. The aperture includes a second size smaller than the first size of the inlet. The inlet, the vent, and the aperture are coaxial. The inlet, the second vent, the first vent, and the aperture are coaxial.

An exterior filter attached to the outer surface of the body extends over the aperture, is permeable to the target gas, and is configured to stop solid particulates carried by the target gas from passing through from the target gas environment to the aperture. The exterior filter extends radially outward over the outer surface of the body from the aperture to a continuous layer of adhesive, sealing the exterior filter to the outer surface of the body.

An interior filter in the first chamber between the inlet and the sensor electrolyte is permeable to the target gas and configured to stop solid particulates carried by the target gas from passing through from the inlet to the sensor electrolyte. The interior filter is supported by a framework in the first chamber. The framework is coupled between the interior filter and the casing, and the interior filter is open to the inlet through the framework.

The sensor electrolyte is carried by an absorbent medium housed in the first chamber. The absorbent medium directly contacts the interior filter. The leads extend into the absorbent medium, electrically connecting the electrodes to the sensor electrolyte. In an exemplary embodiment, the absorbent medium is a wadding of cellulose.

C

According to the principle of the invention, a moisture regulating electrochemical sensor includes a sensor electrolyte and a humidifier housed in a first chamber and a second chamber, respectively, on either side of an intermediate wall, configured with a vent, of a casing configured with electrodes connected electrically to the sensor electrolyte and configured to be connected electrically to an exterior circuit, an inlet to the sensor electrolyte in the first chamber, the vent to the sensor electrolyte in the first chamber and the humidifier in the second chamber, and a vent membrane permeable only to moisture. The inlet allows a target gas to pass through from an exterior target gas environment to the sensor electrolyte in the first chamber. The vent membrane is operatively coupled to the vent, allowing only moisture to translate via the vent between the sensor electrolyte in the first chamber and the humidifier in the second chamber.

The casing additionally includes an opening to an exterior environment and the second chamber, the opening closed by a removable closure disabling fluid exchange through the opening between the exterior environment and the second chamber. The closure extends radially outward over a surface of the casing from opening and sealed releasably to the surface of the casing by an adhesive.

The vent membrane is carried by a carrier attached to the intermediate wall. The carrier extends radially outward over a surface of the intermediate wall from the first vent membrane and is sealed to the surface by an adhesive.

The electrodes are each connected electrically to the sensor electrolyte by a lead and extending outwardly from the casing.

The inlet is configured with a target gas flow controller configured to control a flow of the target gas to the inlet. The inlet includes a first size. The target gas flow controller includes a body including an inner surface, an outer surface, and an aperture extending through the body from the inner surface to the outer surface. The body extends radially outward over an exterior surface of the casing from the aperture registered with the inlet, and outward from the inner surface, sealed to the exterior surface of the casing by an adhesive, to the outer surface. The aperture includes a second size smaller than the first size of the inlet. The inlet, the vent, and the aperture are coaxial.

An exterior filter attached to the outer surface of the body extends over the aperture, is permeable to the target gas, and is configured to stop solid particulates carried by the target gas from passing through from the target gas environment to the aperture. The exterior filter extends radially outward over the outer surface of the body from the aperture to a continuous layer of adhesive, sealing the exterior filter to the outer surface of the body.

An interior filter in the first chamber between the inlet and the sensor electrolyte is permeable to the target gas and configured to stop solid particulates carried by the target gas from passing through from the inlet to the sensor electrolyte. The interior filter is supported by a framework in the first chamber. The framework is coupled between the interior filter and the casing, and the interior filter is open to the inlet through the framework.

The sensor electrolyte is carried by an absorbent medium housed in the first chamber. The absorbent medium directly contacts the interior filter. The leads extend into the absorbent medium, electrically connecting the electrodes to the sensor electrolyte. In an exemplary embodiment, the absorbent medium is a wadding of cellulose.

BRIEF DESCRIPTION OF THE DRAWINGS

Specific objects and advantages of the invention will become apparent to those skilled in the art from the following detailed description of illustrative embodiments thereof, taken in conjunction with the drawings in which.

DETAILED DESCRIPTION

Figure 1:
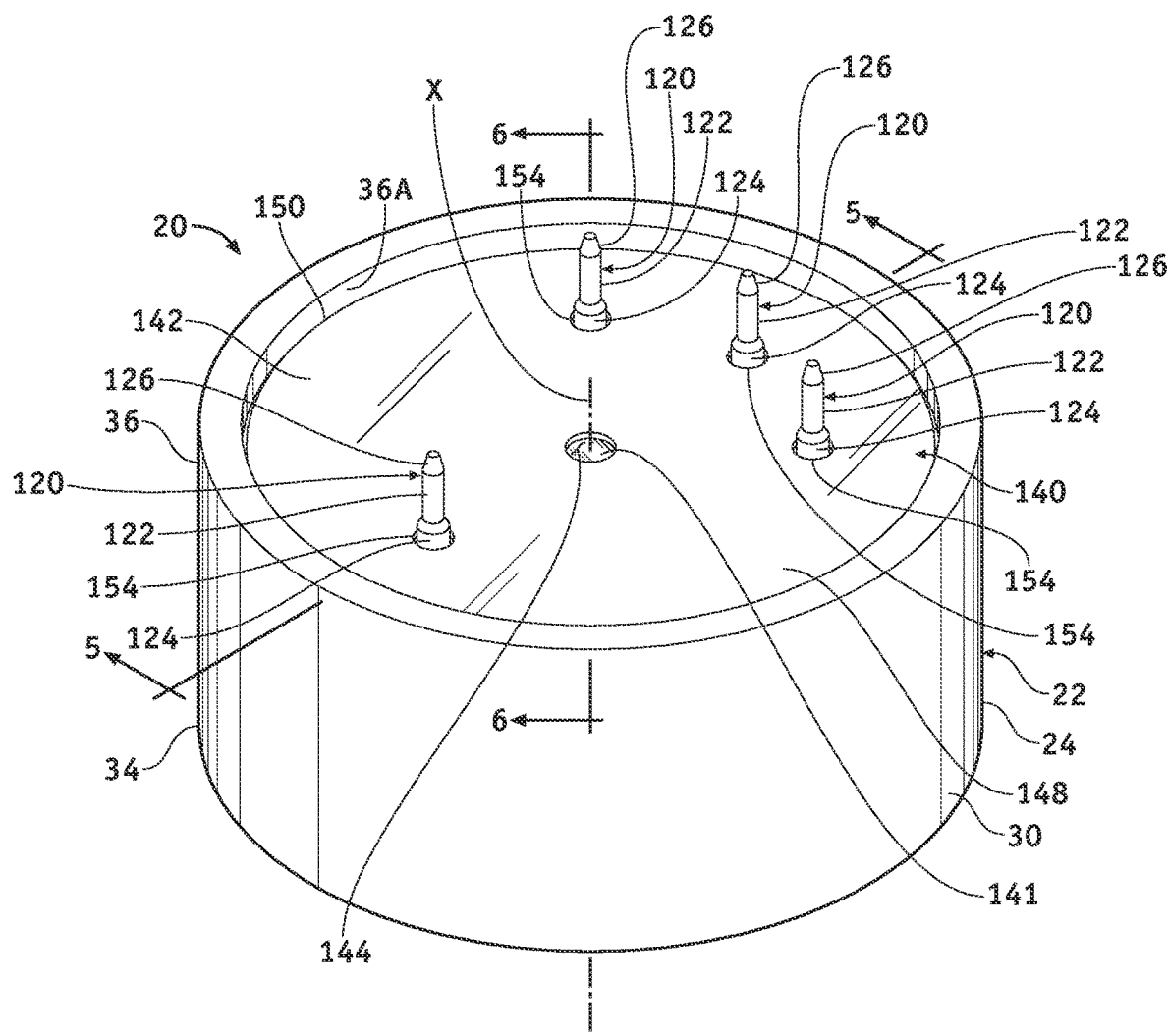
FIG. 1 is a top perspective view of a moisture regulating electrochemical sensor constructed and arranged according to the invention.
Figure 2:
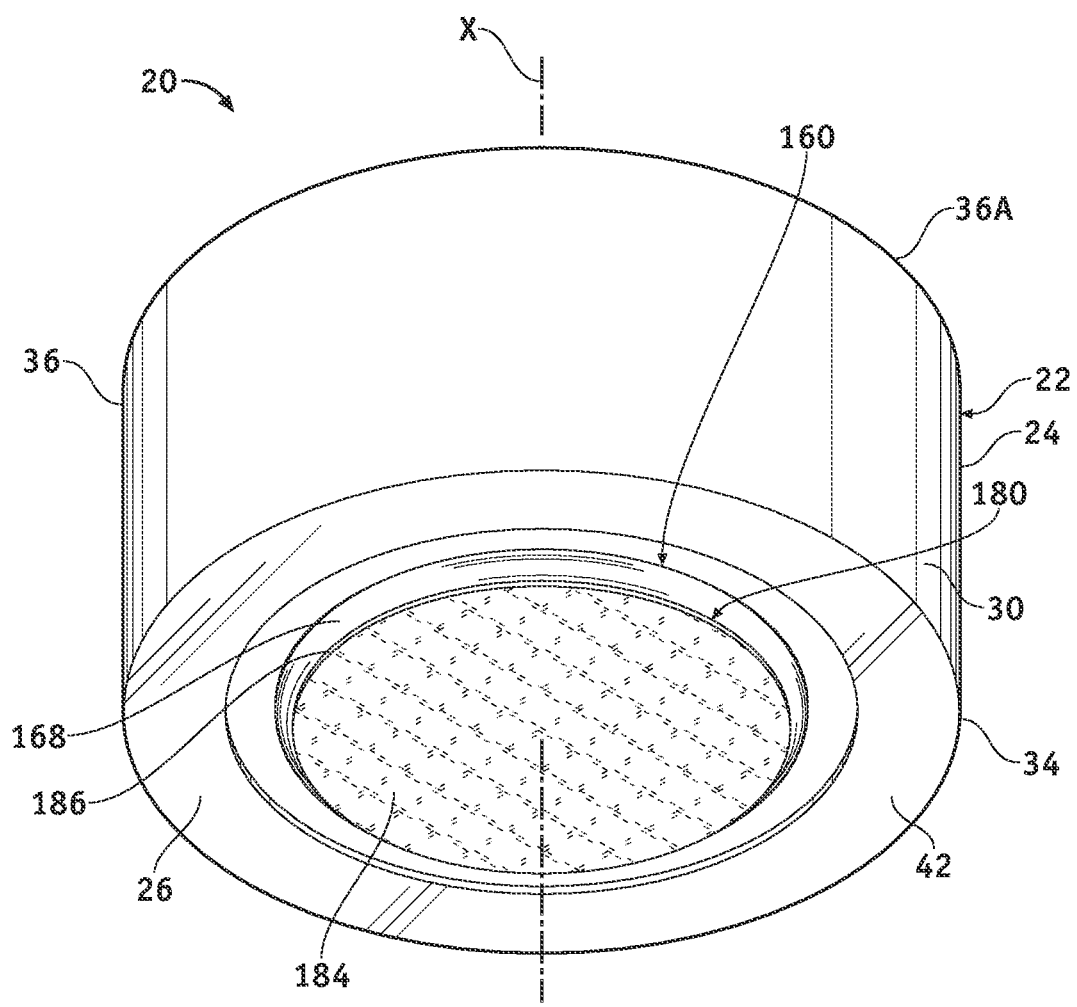
FIG. 2 is a bottom perspective view of the embodiment of FIG. 1.

Disclosed are moisture regulating electrochemical sensors configured for long-term use in low and high humidity target gas environments to detect and measure the concentration of reactive compounds of a target gas from an exterior target gas environment using a sensor electrolyte connected electrically to electrodes configured to be connected electrically to an exterior circuit. The sensor electrolyte has an inherent ERH, an optimum moisture content enabling it to work at a nominal performance standard. The sensors are uniquely configured to forestall moisture uptake by its sensor electrolyte in high humidity environments and dehydration of the sensor electrolyte in low humidity environments.

I

FIGS. 1-6 illustrate a moisture regulating electrochemical sensor 20 constructed and arranged according to the invention. Referring in relevant part to FIGS. 1-6, the sensor 20 includes a casing 22 of plastic, ceramic or other material or a combination of materials with inherently rigid, gas-impervious, fluid-impervious, light-impervious, and non-reactive material characteristics. The casing 22 includes an upright continuous sidewall 24 connected to and extending between a horizontal bottom wall 26 at the bottom of the casing 22 and an opposed horizontal top wall 28 at the top of the casing 22. The bottom wall 26 and the top wall 28 are the respective lower and upper end walls of the casing 22. The continuous sidewall 24, a circular sidewall in this example, includes an exterior or outer surface 30, an interior or inner surface 32, a lower end 34, and an upper end 36. The bottom wall 26 includes an interior or inner surface 40 and an exterior or outer surface 42, and the top wall 28 has an interior or inner surface 44 and an exterior or outer surface 46. The continuous sidewall 24 extends between its lower end 34, connected to the bottom wall 26, and its upper end 36, connected to the top wall 28. The upper end 36 includes an annular rim 36A extending upright from the exterior surface 46.

Figure 5:
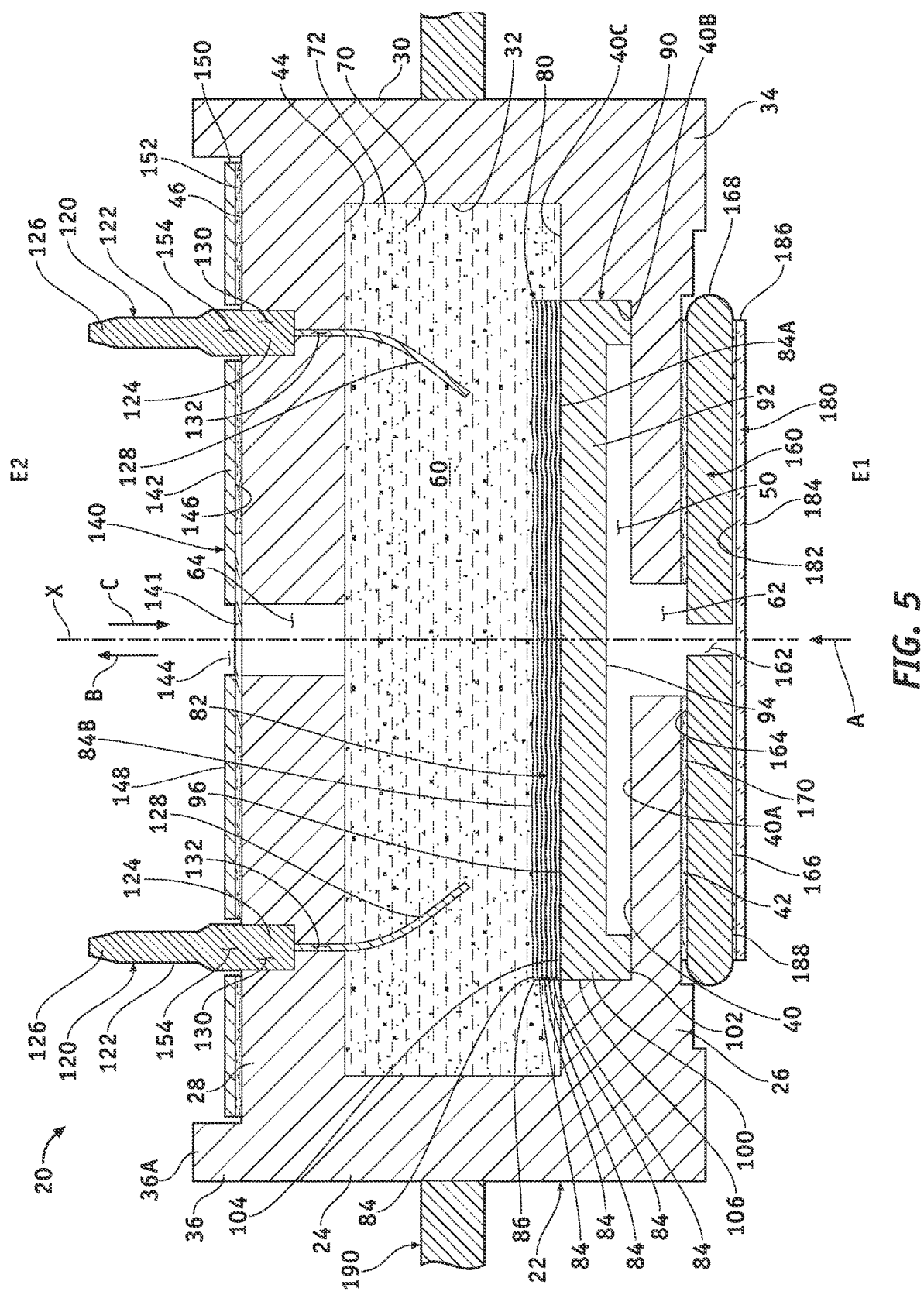
FIG. 5 is a section view taken along line 5-5 of the embodiment of FIG. 1.
Figure 6:
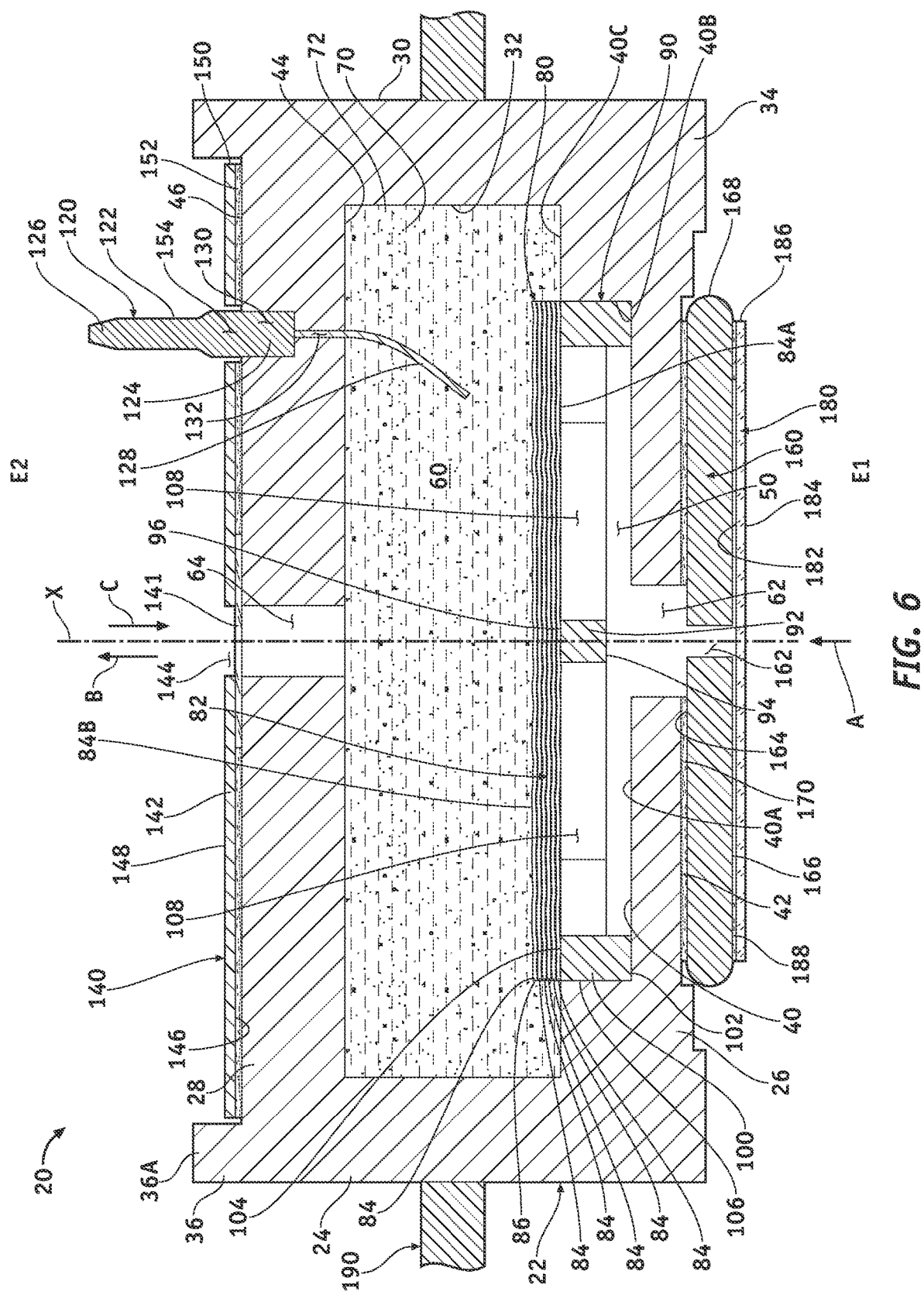
FIG. 6 is a section view taken along line 6-6 of FIG. 1.
Figure 7:
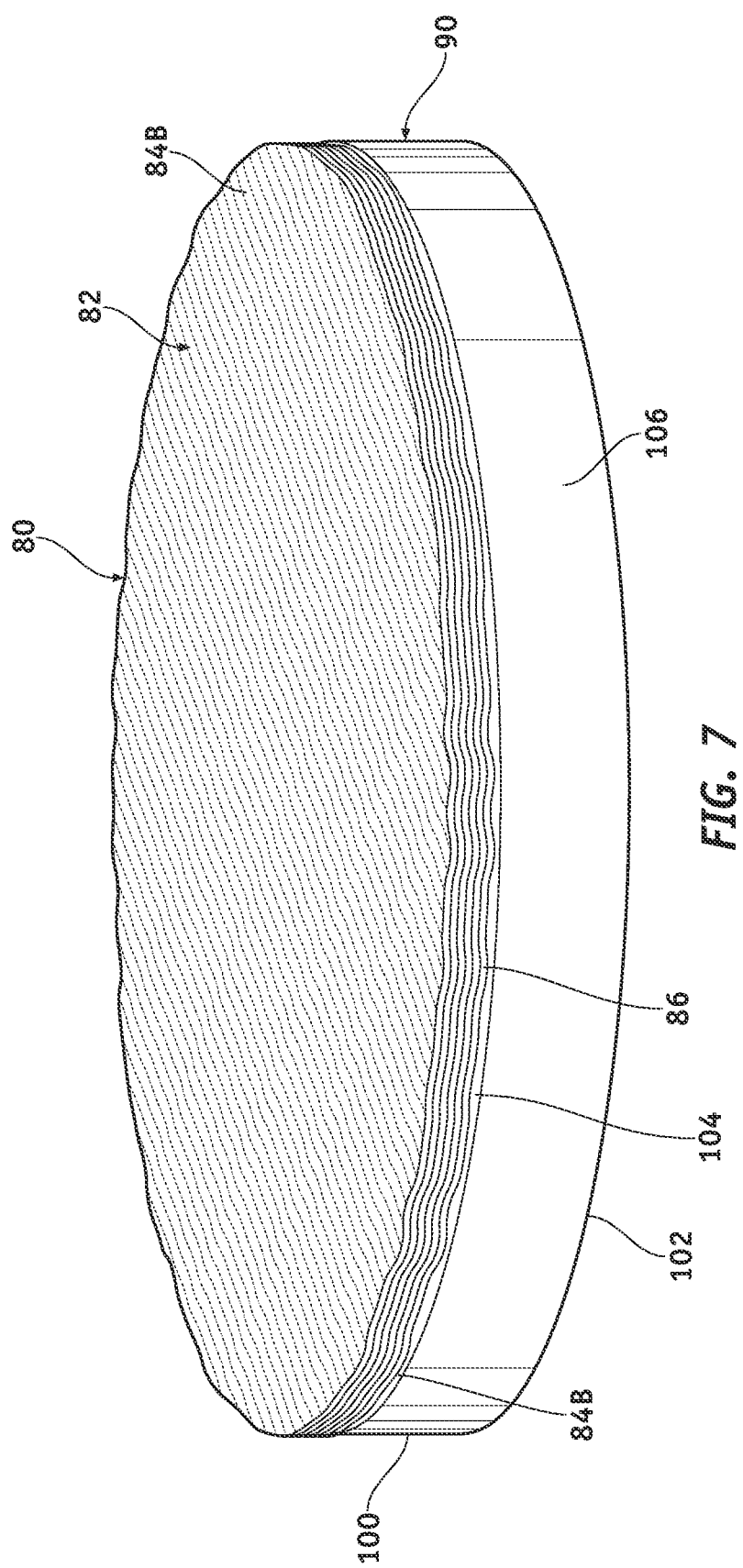
FIG. 7 is a top perspective view of an interior filter assembly first illustrated in FIG. 5.
Figure 8:
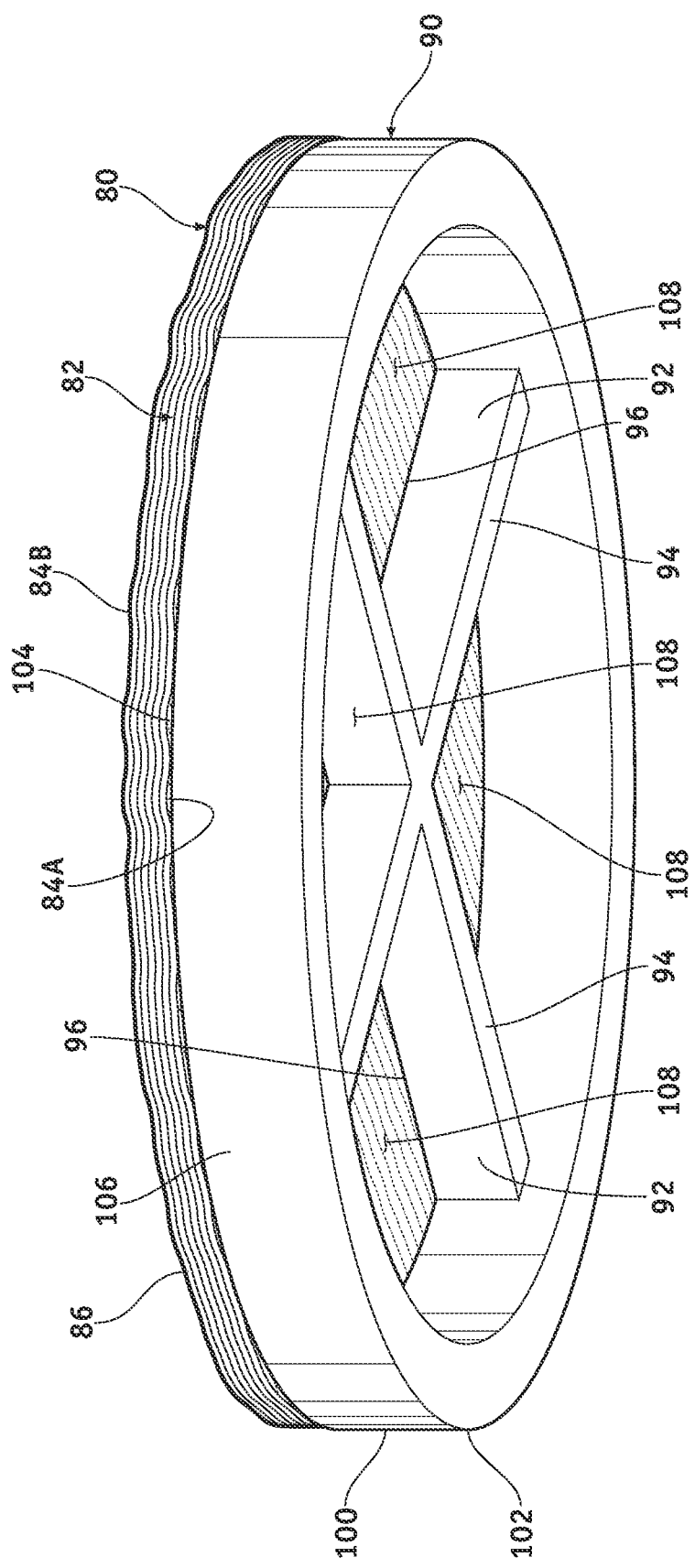
FIG. 8 is a bottom perspective view of the embodiment of FIG. 7.

In FIGS. 5 and 6, the inner surface 32 of the continuous sidewall 24 extends between the inner surface 40 of the bottom wall 26 and the inner surface 44 of the top wall 28. The inner surface 32 of the continuous sidewall 24, the inner surface 40 of the bottom wall 26, and the inner surface 44 of the top wall 28 cooperate to form a chamber 60 in the casing 22. Chamber 60, the sensor's 20 sensing chamber, houses a suitable sensor electrolyte 70 and an interior filter assembly 80. The sensor electrolyte 70 is a standard liquid or gel sensor electrolyte having an inherent ERH, an optimum moisture content enabling it to work at a nominal performance standard. The sensor electrolyte 70 is chosen based on the reactive compounds of the target gas to which the sensor 20 is intended to be sensitive. The bottom wall 26 has a central inlet 62 to chamber 60 and its contents, and the top wall 28 has a central vent 64 to chamber 60 and its contents.

The lower surface 40 defines a counterbore 50. The counterbore 50 is open to and enlarges the inlet 62 and is part of chamber 60. The inner surface 40 includes a continuous lower radial surface 40A, a continuous axial surface 40B, and a continuous upper radial surface 40C. The lower radial surface 40A and the axial surface 40B define the counterbore 50 centered in the bottom wall 26. The lower radial surface 40A extends radially outward from inlet 62 to the axial surface 40B. The axial surface 40B extends upright from the lower radial surface 40A to the upper radial surface 40C. The upper radial surface 40C extends radially outward to the inner surface 32 of the continuous sidewall 24.

The inlet 62 is an opening that extends through the bottom wall 26 from the outer surface 42 to the inner surface 40 and opens to the outer surface 42 and the lower radial surface 40A. The vent 64 is an opening that extends through the top wall 28 from the outer surface 46 to the inner surface 44 and opens to the inner surface 44 and the outer surface 46. The inlet 62 allows the target gas to pass through from the target gas environment to chamber 60 and its contents. The vent 64 allows moisture to translate through between the vent or control environment and chamber 60 and its contents. The counterbore 50, chamber 60, the inlet 62, and the vent 64 are coaxial, arranged about an axis X, about which the casing 22 is arranged and symmetrical.

In FIGS. 5 and 6, an absorbent, inherently porous, and gas- and moisture-permeable medium or material 72 in chamber 60 is a carrier that holds the sensor electrolyte 70. The sensor electrolyte 70 is dispersed throughout the medium 72 arranged and symmetrical about axis X. The sensor electrolyte 70, a liquid or gel, impregnates and moistens the medium 72. The medium 72, a wadding of cellulose in a preferred embodiment, is configured to be wettened/moistened with and hold the sensor electrolyte 70 and is non-reactive to the sensor electrolyte 70 and the target gas and its contents. The medium 72 extends radially outward from axis X to the inner surface 32 of the continuous sidewall 24 and upwardly from the upper radial surface 40C of the inner surface 40 of the casing's 22 bottom wall 26 and the interior filter assembly 80 to the inner surface 44 of the casing's 22 top wall 28.

The interior filter assembly 80 in chamber 60 is between the inlet 62 and the medium 72 and its sensor electrolyte 70. The interior filter assembly 80 includes an interior filter 82 supported by an interior framework 90 coupled between the filter 82 and the casing 20. The filter 82 is a suitable porous and waterproof target gas filter permeable to the target gas but not solid particulates carried by the target gas. Accordingly, the filter 82 is configured to allow the target gas to pass through to the medium 72 and its sensor electrolyte 70 from the inlet 62 and stop solid particulates carried by the target gas from passing through from the inlet 62 to the medium 72 and its sensor electrolyte 70 that could contaminate the medium 72 and the sensor electrolyte 70. The framework 90 in the bottom wall's 26 counterbore 41 supports the filter 82 in chamber 60.

Referring to FIGS. 5-8 in relevant part, the filter 82 consists of superimposed, disk-shaped layers, sheets, or membranes 84 stacked axially atop the framework 80 in the counterbore 50 over the inlet 62. The layers 84 are made of polytetrafluoroethylene, a synthetic fluoropolymer of tetrafluoroethylene commercially available under the trademark TEFLON® or other like or similar material or combination of materials with inherently porous and waterproof material characteristics. There are six layers 84 in this embodiment, and less or more layers 84 can be used in alternate embodiments, provided the filter 82 remains suitable for its intended purpose described herein.

The framework 90 is of plastic, ceramic or other material or a combination of materials with inherently rigid and non-reactive material characteristics, includes intersecting cross members 92, each including a lower surface 94 and an upper surface 96, and a perimetric sidewall 100, including a lower end 102, an upper end 104, and an outer surface 106 extending upright from the lower end 102 to the upper end 104. The cross members 92 extend radially outward through the counterbore 50 to the perimetric sidewall 100 from the geometric center of the framework 90 at axis X. The cross members 92 and the perimetric sidewall 100 cooperate to form openings 108, pie-shaped openings in this embodiment, through the framework 90 from the lower surfaces 94 of the cross members 92 to the upper surfaces 96 of the cross members 92. The outer surface 106 is in direct contact against the axial surface 40B. The perimetric sidewall 100 extends upright through the counterbore 50 from its lower end 102 on the inner radial surface 40A to the lower surfaces 94 of the cross members 92 and therebeyond to its upper end 104 and the upper surfaces 96 of the cross members 92. The upper end 104 and the upper surfaces 96 are flush with the upper radial surface 40C.

The vertical stack of layers 84 extends upright into chamber 60 from the lowermost layer 84A of the stack of layers 84, set directly upon the upper end 104 of the perimetric sidewall 100, to the uppermost most layer 84B of the stack of layers 84. The layers 84, in turn, extend radially outward from axis X to their perimeter extremities 86 aligned axially with the perimeter sidewall's 100 outer surface 106 in direct contact against the axial surface 40B. The medium 72 and its sensor electrolyte 70 are in direct contact with and extend over the perimeter extremities 86 of the stack of layers 84 and the uppermost layer 84B of the stack of layers 84. The openings 108 through the framework 90 open the inlet 62 to the filter 82.

In FIGS. 1, 2, 5, and 6, casing 22 is configured with electrodes 120. The electrodes 120, standard working and reference electrodes, are carried by the casing's 22 top wall 26, spaced apart, connected electrically to the sensor electrolyte 70 in FIGS. 5 and 6, and configured to be connected electrically to an exterior circuit.

In FIGS. 5 and 6, each electrode 120, fashioned of brass or other electrically conductive and corrosion-resistant alloy or metal, includes an elongate body 122, including a base 124, secured in a counterbore 130 formed in the top wall 28, and a connection end 126. The counterbore 130, milled, molded, or otherwise formed in the thickness of the material of the top wall 28, is between the exterior surface 46 and the inner surface 44. The counterbore 130 opens upwardly to the exterior surface 46 and extends a distance downwardly from the exterior surface 46 to a bore 132 milled, molded, or otherwise formed in the thickness of the material of the top wall 28 from the bottom of the counterbore 130 to the inner surface 44. The body 122 extends upright from its base 124 secured or otherwise anchored in the counterbore 130 to the exterior surface 46 and beyond the exterior surface 46 to the connection end 126 configured to be connected electrically to an exterior circuit using standard techniques. The base 124 is press-fit in the counterbore 130. The skilled person can apply a suitable adhesive between the base 124 and the counterbore 130 to adhere the base 124 to the counterbore 130 adhesively. A lead 128, a standard wire of copper or other electrically-conductive metal, connected electrically to the electrode 120 extends through the bore 130 from the base 124 to the inner surface 44 and beyond the inner surface 44 into the medium 72 and its sensor electrolyte 70, electrically connecting the electrode 120 to the sensor electrolyte 70.

Figure 3:
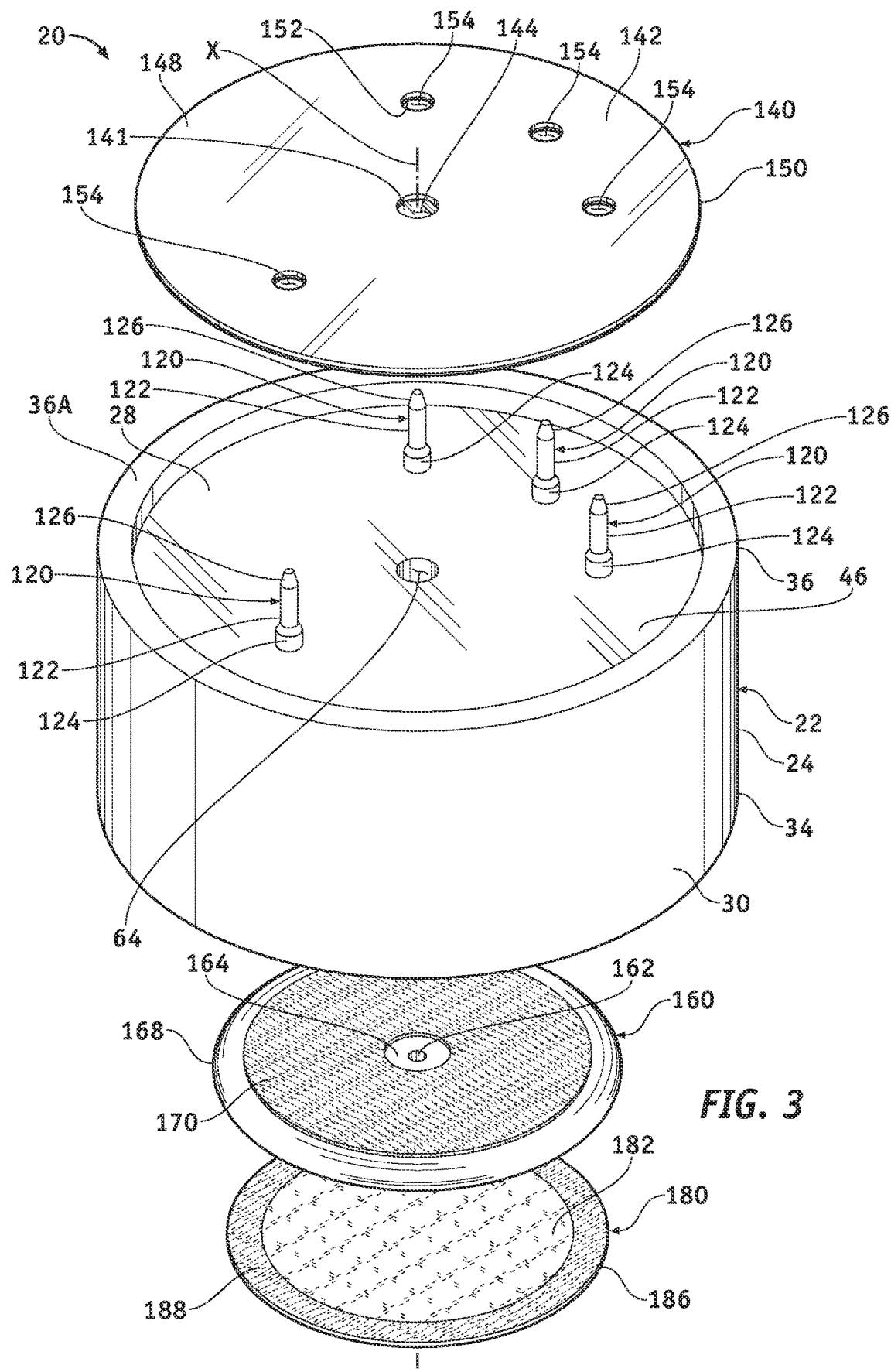
FIG. 3 is a partially exploded perspective view of the embodiment of FIG. 1.
Figure 4:
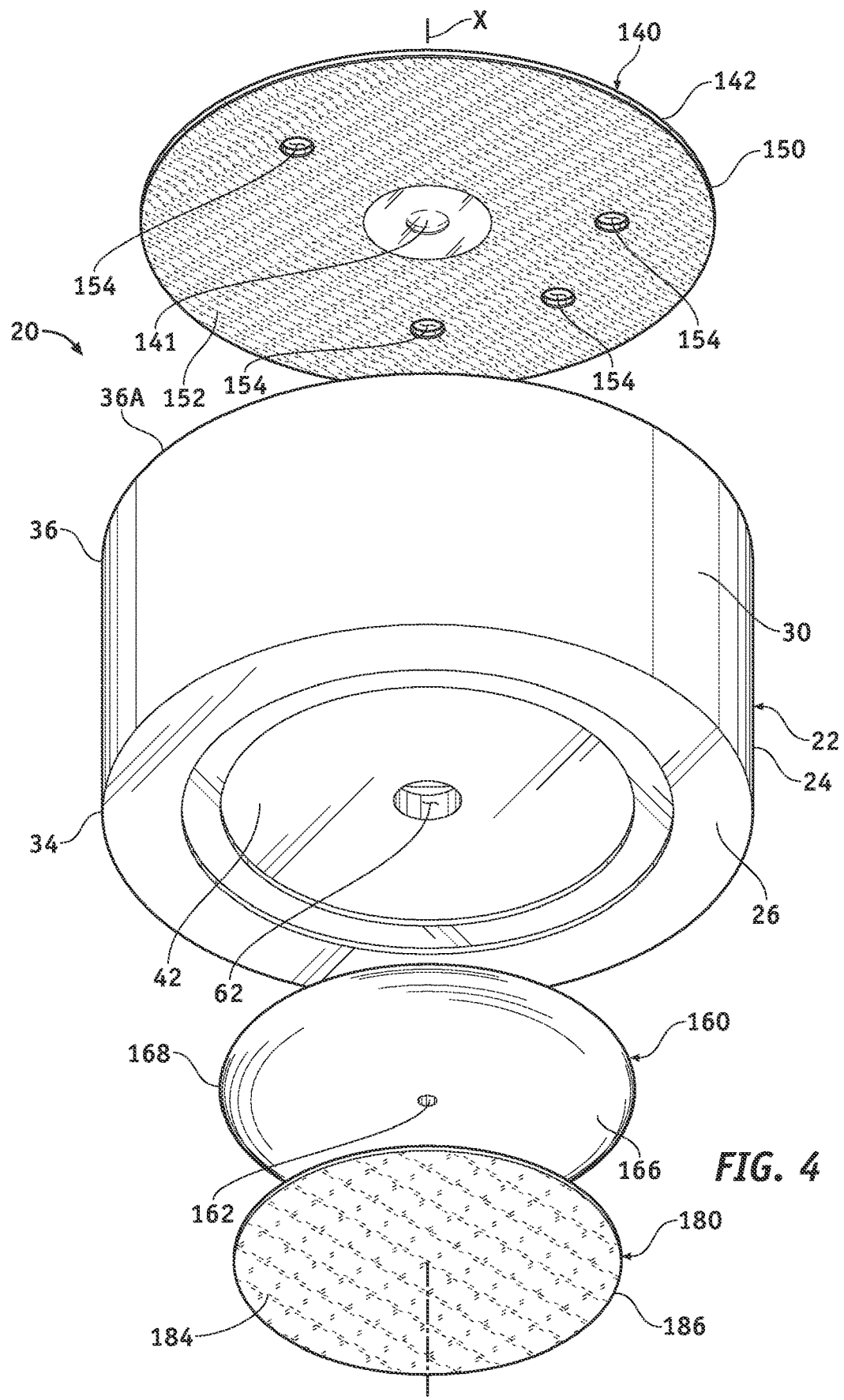
FIG. 4 is a partially exploded perspective view of the embodiment of FIG. 2.

The sensor 20 has a membrane 141, shown in FIGS. 1 and 3-6, a target gas flow controller 160, shown in FIGS. 2-6, and an exterior filter 180, shown in FIGS. 2-6. In FIGS. 5 and 6, the membrane 141, a non-gas permeable disk-shaped membrane permeable only to moisture, is operatively coupled to the vent 64, allowing only moisture to translate through the vent 64 between the exterior vent or control environment and the medium's 72 sensor electrolyte 70 in chamber 60. The membrane 141, a sulfonated tetrafluoroethylene based fluoropolymer-copolymer membrane commercially available under the trademark NAFION® or other like or similar material or combination of materials permeable only to moisture, is outside chamber 60 over the underlying vent 64 and extends radially outward from axis X and beyond the vent 64 over the exterior surface 46 of the top wall 28 and to a carrier 142 coupled between the membrane 141 and the exterior surface 46 of the top wall 28. The carrier 142, a rugged, flat, disk-shaped sheet of plastic secured releasably to the exterior surface 46 and secured to the membrane 141, such as by heat bonding or a suitable adhesive, supports the membrane 141 and includes an opening 144, an inner surface 146, an outer surface 148, and a perimeter edge 150. The membrane 141 and carrier 142 assembly is a "membraned" carrier denoted generally by 140. The opening 144 extends centrally through the thickness of the carrier 142 from the inner surface 146 to the outer surface 148. The carrier 142 extends radially outward over the top wall's 28 exterior surface 46 from the membrane 141 and the opening 144, open to and axially registered over the membrane 141, and the vent 64 to the electrodes 120 and beyond the electrodes 120 to the perimeter edge 150 adjacent to the casing's 22 annular rim 36A. The carrier's 142 axial thickness extends outwardly to its outer surface 148 from its inner surface 146 facing the exterior surface 46. In FIGS. 4-6, the inner surface 146 has a continuous layer 152 of a suitable adhesive in FIGS. 4-6 that extends radially outwardly from the membrane 141 to the perimeter edge 150. The layer 152 adheres and seals the inner surface 146 to the exterior surface 46 in FIGS. 5 and 6, sealing the membrane 141 over the vent 64 to allow only moisture to transfer through the vent 64 between the exterior vent or control environment and the medium's 72 sensor electrolyte 70 in chamber 60. Each electrode 120 extends outwardly from top wall's 28 exterior surface 46 and through and beyond an opening 154 concurrently extending through the thicknesses of the layer 152 of adhesive and the carrier 142 to its connection end 126, which helps align the membrane 141 axially over the vent 64 and register the opening 144 axially with the vent 64.

The adhesive application of the membraned carrier 140 to the top wall's 28 exterior surface 46 enables a user to peel the membraned carrier 140 away from the exterior surface 46 and replace it with a fresh one when needed. In an alternate construction, the skilled person may invert the membraned carrier 140, resize it as needed, secure it in chamber 60 to the top wall's 38 inner surface 44 to locate the membrane 141 under the vent 64, and configure the carrier 142 and the layer 152 of adhesive with appropriate openings for the leads 128 to extend through.

The target gas flow controller 160 in FIGS. 2-6 is configured to control the flow of target gas to the inlet 62 in FIGS. 4-6 to prevent the medium 72 and its sensor electrolyte 70 from being overwhelmed with the target gas. The controller 160, a stiff, rugged, flat, disk-shaped body of plastic, ceramic, or the like, includes an aperture 162, an inner surface 164, and an outer surface 166. The aperture 162 extends centrally through the controller's 160 thickness from its inner surface 164 to its outer surface 166. The controller 160 is outside the casing's 22 chamber 60 and extends radially outward over the exterior surface 42 of the casing's 22 bottom wall 26 from the controller's 160 aperture 162 under and registered axially with the inlet 62 to the controller's 160 perimeter edge 168. The axial thickness of the controller 160 extends outwardly to its outer surface 166 from its inner surface 164 facing the exterior surface 42. In FIGS. 3, 5, and 6, the inner surface 164 has a continuous layer 170 of a suitable adhesive that extends radially outwardly from adjacent to the aperture 162 to adjacent to the perimeter edge 168. The releasably adheres and seals the controller's 160 inner surface 164 to the exterior surface 42 of the bottom wall 26 in FIGS. 5 and 6. The inlet 62 has a size, and the controller's 160 aperture 162 under and registered axially with the inlet 62 has a size. The size of the controller's 160 aperture 162 is less than that of the casing's 22 inlet 62. Accordingly, the controller's 160 aperture 162 inherently restricts the target gas flow to the inlet 62 to control the flow of the target gas to the inlet 62. The skilled person chooses the size of the controller's 160 aperture 162 relative to the size of the inlet 62 to allow the aperture to desirably restrict the flow of target gas to the inlet 62. The restriction of the flow of the target gas to the inlet 62 increases as the size of the aperture 162 relative to the inlet 62 decreases and decreases as the size of the aperture 162 relative to the inlet 62 increases. The carrier's 142 opening 144 and membrane 141, the vent 64, the inlet 62, and the controller's aperture 162 are coaxial, being arranged about axis X.

The exterior filter 180 in FIGS. 2-6, operatively coupled to the controller's 160 aperture 162 in FIGS. 5 and 6, is a suitable target gas filter permeable to the target gas but not solid particulates carried by the target gas. Accordingly, the exterior filter 180 is configured to allow the target gas to pass through to the aperture 162 and stop solid particulates carried by the target gas from passing through to the aperture 162.

The exterior filter 180, a flat, disk-shaped layer, sheet, or membrane of a porous and waterproof material, such as the material commercially available under the trademark GORE-TEX® or other like or similar material or combination of materials, includes an inner surface 182 and an outer surface 184. The exterior filter 180 extends radially outward from axis X over the controller's 160 outer surface 166 from under the aperture 162 to the exterior filter's 180 perimeter edge 186 inboard of the controller's 160 perimeter edge 168. The exterior filter's 180 axial thickness extends outwardly to its outer surface 184 from its inner surface 182 facing the controller's 160 outer surface 166. The inner surface 182 has a continuous layer 188 of a suitable adhesive. The inner surface 182 extends radially outward over the controller's 160 outer surface 166 from axis X to the continuous layer 188 proximate to the exterior filter's 180 perimeter edge 186. The layer 188 releasably adheres and seals the inner surface 182 of the exterior filter 180 to the controller's 160 outer surface 166, sealing the exterior filter 180 under the inlet 62 to the outer surface 166 to allow the exterior filter 180 to stop solid particulates carried by the target gas from passing through to the aperture 162 and allow the target gas to pass through to the aperture 162.

The exterior adhesive application of the controller 160 to the bottom wall's 26 exterior surface 42 enables a user to peel the controller 160 away from the exterior surface 42 and replace it with a fresh one when needed. The exterior adhesive application of the filter 180 to the outer surface 166 of the controller 160 enables a user to peel the filter 180 away from the outer surface 166 and replace it with a fresh one when needed.

The described sensor 20 is configured for long-term use in low and high humidity target gas environments to measure the given target gas concentration by oxidizing or reducing it by the sensor electrolyte 70 in chamber 60 and measuring the resulting current applied to the electrodes 120, forestall moisture uptake by the sensor electrolyte 70 in high humidity target gas environments and dehydration of the sensor electrolyte 70 in low humidity target gas environments to maintain the sensor electrolyte's 70 inherent ERH enabling the sensor electrolyte 70 to continually operate at its nominal performance standard. The sensor 20, coupled between a target gas environment E1 and a vent or control environment E2, is configured to intake the target gas to chamber 60 and its contents from the target gas environment E1 via the inlet 62 and exchange moisture between the vent or control environment E2 and chamber 60 and its contents via vent 64 to maintain the sensor electrolyte's 70 inherent ERH.

The target gas passes from the target gas environment E1 in the direction of arrow A in FIGS. 5 and 6 through the exterior filter 180 to the aperture 162, through the aperture 162 to the inlet 62, through the inlet 62 to the chamber's 60 counterbore 50, through the counterbore 50 and to and through the framework's 90 openings 108 (FIG. 6) to the filter 82, and through the filter 82 to the medium 72 in chamber 60 where the target gas contacts the sensor electrolyte 70, which oxidizes/reduces the target gas. The resulting electrochemical reaction produces an electric current/signals that passes to the electrodes 120 via the leads 128 and to an exterior circuit when connected electrically to the connection ends 126 of the electrodes 120. A measuring or control instrument electrically connected to the exterior circuit receives the electric current/signals that it uses to identify/detect and measure the concentration of one or more target gas components. In addition to detecting/identifying, measuring, amplifying, and performing other signal processing functions, the skilled person may configure the exterior circuit to maintain the voltage facing the sensor 20 between its electrodes 120 according to standard practice.

The exterior filter 180 is configured to stop particulate contaminants carried by the target gas from passing through to controller's 160 aperture 162, into the inlet 62 from the aperture 162, and into chamber 60 from the inlet 62, contaminating the chamber's 60 contents. The size of the controller's 160 aperture 162 relative to the casing's 22 inlet 62 selectively restricts and thereby controls the flow of the target gas to the inlet 62 and into chamber 60 through the casing's 22 inlet 62 from the target gas environment E1 to prevent the medium 72 and its sensor electrolyte 70 from being overwhelmed with the target gas. Again, a user chooses the size of the controller's 160 aperture 162 relative to the casing's 22 inlet 62 to provide a desired flow of the target gas to the inlet 62 and into chamber 60 through the casing's 22 inlet 62 from the target gas environment E1. The filter 82 is configured to stop particulate contaminants carried by the target gas that may escape through the exterior filter 180 from passing to and contaminating the medium 72 and its sensor electrolyte 70.

The vent environment E2 is enclosed or otherwise isolated from the target gas environment E1 during the use of the sensor 20, such as by a housing 190 in FIGS. 5 and 6 or the like coupled to the casing 22 to isolate the target gas environment E1 to the inlet 62 from the vent environment E2 to the vent 64. The vent's 64 membrane 141, the sensor's 20 non-gas permeable membrane permeable only to moisture, between the vent environment E2 and the sensor's 20 chamber 60 allows only moisture exchange/transfer via vent 64 between the vent environment E2 and chamber 60 and its contents, disabling target gas components from passing to and contaminating the vent environment E2 from the sensor's 20 chamber 60 and components other than moisture from passing to and contaminating the sensor's 20 chamber 60 from the vent environment E2. The target gas entering casing's 22 chamber 60 via the inlet 62 from the target gas environment E1 has the same humidity level, i.e. moisture content, as the target gas environment E1. The moisture content of the target gas environment E1 can be the same as the vent environment E2, higher than the vent environment E2, or lower than the vent environment E2. The target gas environment E1 is a high humidity environment when the moisture content of the target gas of the target gas environment E1 is greater than the moisture content of the vent environment E2. The target gas environment E1 is a low humidity environment when the moisture content of the target gas of the target gas environment E1 is less than the moisture content of the vent environment E2.

The operation of sensor 20 in a high humidity target gas environment E1 is as follows. The membrane 141 continually exhausts moisture through vent 64 in the direction of arrow B in FIGS. 5 and 6 from chamber 60 to vent environment E2 due to the humidity differential between chamber 60 and vent environment E2. The membrane 141 concurrently stops all but moisture from passing through via vent 64 between chamber 60 and the vent environment E2. The continual moisture exhaust from chamber 60 to vent environment E2 via vent 64 constantly prevents medium 72 and sensor electrolyte 70 from absorbing the target gas moisture, constantly forestalling sensor electrolyte 70 from diluting and its inherent ERH from changing, disabling sensor electrolyte 70 from working at its nominal performance standard. The constant evacuation of moisture from chamber 60 to the vent environment E2 prevents the sensor electrolyte 70 from diluting, keeping it suitably conditioned or otherwise hydrated at its inherent ERH. Accordingly, sensor 20 is uniquely configured for long-term use in a high humidity target gas environment, and to regulate moisture between the chamber 60 and its contents and the vent environment.

The operation of sensor 20 in a low humidity target gas environment E1 is as follows. The membrane 141 continually supplies moisture through vent 64 in the direction of arrow C in FIGS. 5 and 6 from vent environment E2 to chamber 60 due to the humidity differential between chamber 60 and the vent environment E2. The membrane 141 concurrently stops all but moisture from passing through via vent 64 between chamber 60 and the vent environment E2. The continual moisture supply from vent environment E2 to chamber 60 via vent 64 constantly prevents medium 72 and sensor electrolyte 70 from drying, constantly forestalling sensor electrolyte 70 from concentrating and its inherent ERH from changing, disabling sensor electrolyte 70 from working at its nominal performance standard. The constant moisture supply to chamber 60 from vent environment E2 prevents sensor electrolyte 70 from concentrating, keeping it suitably conditioned or otherwise hydrated at its inherent ERH. Accordingly, sensor 20 is uniquely configured for long-term use in a low humidity target gas environment.

The sensor 20 is uniquely configured to enable moisture exchange/regulation between chamber 60 and vent environment E2 in low and high humidity target gas environments for keeping the sensor electrolyte 70 in chamber 60 suitable hydrated, keeping it at its inherent ERH for enabling it to work at its nominal performance standard. When the moisture contents, i.e. the humidity levels, of the target gas environment E1 and the vent environment E2 are the same, the moisture exchange between chamber 60 and the vent environment E2 via vent 64 is negligible. The vent environment E2 can be set to a selected moisture content by one or more moisture sources, such as one or more humidifiers, depending on the moisture content of the target gas environment E1.

II

Figure 9:
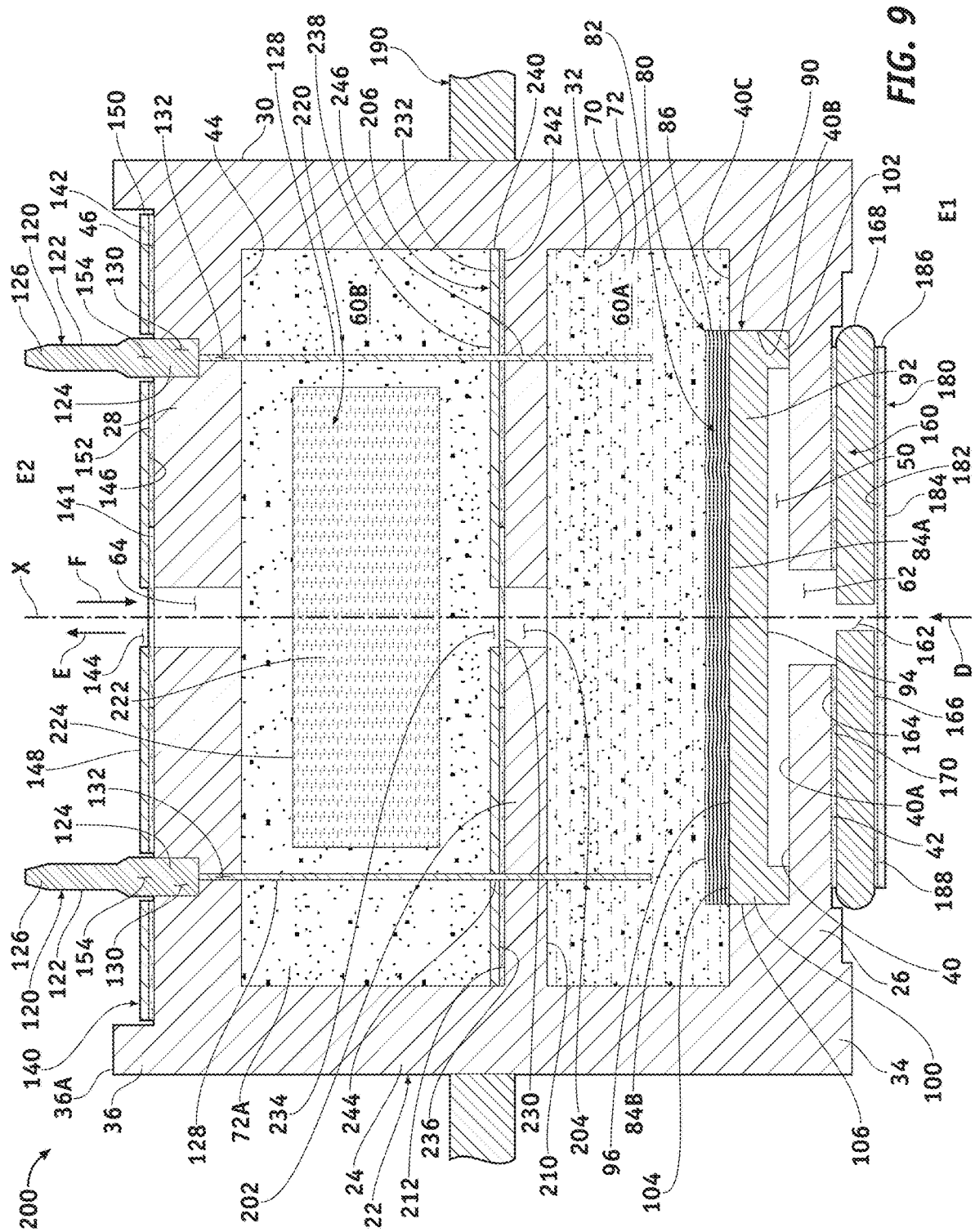
FIG. 9 is a vertical section view of another embodiment of a moisture regulating electrochemical sensor constructed and arranged according to the invention.

FIG. 9 is a vertical section view like FIG. 5, illustrating another embodiment of a moisture regulating electrochemical sensor 200 constructed and arranged according to the invention. In common with sensor 20, sensor 200 shares casing 22, medium 72, sensor electrolyte 70, interior filter assembly 80, electrodes 120, membraned carrier 140, controller 160, exterior filter 180, and their related appurtenances described above and denoted with the corresponding reference numerals for reference purposes. In sensor 200, casing 22 is somewhat longer axially from its bottom wall 26 to its top wall 28 and has an intermediate wall 202 configured with a vent 204 and a membraned carrier 206, all in chamber 60.

The intermediate wall 202 in chamber 60 is connected to continuous sidewall 24, parallel to and between the bottom wall 26 and the top wall 28 bottom wall 26, includes a lower surface 210 and an upper surface 212, and divides chamber 60 into two chambers 60A and 60B. The inner surface 32 of the continuous sidewall 24 extends between the inner surface 40 of the bottom wall 26 and the lower surface 210 of the intermediate wall 202 and between the upper surface 212 of the intermediate wall 202 and the inner surface 44 of the top wall 28. The inner surface 32 of the continuous sidewall 24, the inner surface 40 of the bottom wall 26, and the lower surface 210 of the intermediate wall 202 cooperate to form chamber 60A in the casing 22. The inner surface 32 of the continuous sidewall 24, the upper surface 212 of the intermediate wall 202, and the upper surface 44 of the top wall 28 cooperate to form chamber 60B in the casing 22. Chamber 60A, the lower chamber, is under chamber 60B, the upper chamber. Chamber 60A, the sensor's 200 sensing chamber, houses the medium 72 and its sensor electrolyte 70, and the interior filter assembly 80. Chamber 60B, the sensor's 200 moisture controlling chamber, houses a medium 72A and a humidifier 220. The intermediate wall's 202 vent 204, the sensor's 200 interior vent, is to chamber 60A and its contents and chamber 60B and its contents.

The vent 204 is an opening that extends centrally through the intermediate wall 202 from the lower surface 210 to the upper surface 212. The vent 204 allows moisture to translate through between chamber 60B and chamber 60A and its contents. The vent 204 is open to the intermediate wall's 202 lower surface 210 and upper surface 212. The counterbore 50, chambers 60A and 60B, the inlet 62, the vent 64, and the vent 204 are coaxial, arranged about axis X, about which the casing 22 is arranged and symmetrical. The vent 64 allows moisture to translate through between the exterior vent environment E2 and chamber 60B and its contents.

Like the sensor 20, the medium 72 in chamber 60A supports the sensor electrolyte 70 and is arranged and symmetrical about axis X. The medium 72 extends radially outward from axis X to the inner surface 32 of the continuous sidewall 24 and upwardly from the upper radial surface 40C of the inner surface 40 of the casing's 22 bottom wall 26 and the interior filter assembly 80 to the lower surface 210 of the casing's 22 intermediate wall 202. The interior filter assembly's 80 framework 90 is situated in and extends upright through the counterbore 50 to its filter 82, the stack layers 84. The medium 72 and its sensor electrolyte 70 in chamber 60A are in direct contact with and extend over the perimeter extremities 86 of the stack of layers 84 and the uppermost layer 84B of the stack of layers 84.

The medium 72A in the second chamber 60A is the same as the medium 72 in chamber 60A, except that it supports the humidifier 220 and does not have a sensor electrolyte. The medium 72A is the carrier for the humidifier 220 encased in the medium 72A. The medium 72A and the humidifier 220 are arranged and symmetrical about axis X. The medium 72A extends radially outward from axis X to the inner surface 32 of the continuous sidewall 24 and upwardly from the upper surface 212 of the intermediate wall 202 to the inner surface 44 of the casing's 22 top wall 28. The humidifier 220 is a standard, commercially-available two-way humidity control pack, a moistened gel 220 housed in a moisture-permeable membrane 222, configured to hold, release, and absorb moisture.

The interior membraned carrier 206 includes a membrane 230 and a carrier 232. The membrane 230, a non-gas permeable disk-shaped membrane permeable only to moisture and the sensor's 200 interior membrane, is identical to membrane 141 and operatively coupled to the vent 204, allowing only moisture to translate through the vent 204 between chamber 60B and its contents and the medium's 72 sensor electrolyte 70 in chamber 60A. The membrane 230 is outside chamber 60A and in chamber 60B over the underlying vent 204 and extends radially outward from axis X and beyond the vent 204 over the upper surface 212 of the intermediate wall 202 and to the carrier 232 coupled between the membrane 230 and the upper surface 212 of the intermediate wall 202. The carrier 232, a rugged, flat, disk-shaped sheet of plastic secured to the membrane 230, such as by heat bonding or a suitable adhesive, supports the membrane 230 and includes an opening 234, a lower surface 236, an upper surface 238, and a perimeter edge 240. The membrane 230 and carrier 232 assembly form the membraned carrier 206. The opening 234 extends centrally through the thickness of the carrier 232 from the lower surface 236 to the upper surface 238. The carrier 232 extends radially outward over the intermediate wall's 202 upper surface 212 from the membrane 230 and the opening 234 open to and axially registered over the membrane 230 and the vent 204 to the perimeter edge 240 adjacent to the inner surface 32 of the continuous sidewall 24. The carrier's 232 axial thickness extends to its upper surface 238 from its lower surface 236 facing the upper surface 212. The inner surface 236 has a continuous layer 242 of a suitable adhesive that extends radially outwardly from the membrane 230 to the perimeter edge 240. The layer 242 adheres and seals the inner surface 236 to the upper surface 212, sealing the membrane 230 over the vent 204 to allow only moisture to transfer through the vent 204 between chamber 60A and chamber 60B. In an alternate embodiment, the skilled person may invert the membraned carrier 206 and secure it in chamber 60A to the intermediate wall's 202 lower surface 210 to locate the membrane 230 under the vent 204.

Each electrode 120 lead 128 extends through its bore 130 from the base 124 of its electrode 120 to the inner surface 44 of the top wall 28 and beyond the inner surface 44 into the medium 72A in chamber 60B. The lead 128 extends through the medium 72A to and through an opening 244 through the thicknesses of the carrier 232 and its layer 242 of adhesive, through a corresponding opening 246 extending through the thickness of the intermediate wall 202 from its upper surface 212 to its lower surface 210, and into the medium 72 in chamber 60A, electrically connecting the lead's 128 electrode 120 to the sensor electrolyte 70 in medium 72.

The described sensor 200 is configured for long-term use in low and high humidity target gas environments to measure the given target gas concentration by oxidizing or reducing it by the sensor electrolyte 70 in chamber 60A and measuring the resulting current applied to the electrodes 120, forestall moisture uptake by the sensor electrolyte 70 in high humidity target gas environments and dehydration of the sensor electrolyte 70 in low humidity target gas environments to maintain the sensor electrolyte's 70 inherent ERH enabling the sensor electrolyte 70 to continually operate at its nominal performance standard. The sensor 200, coupled between the target gas environment E1 and the vent or control environment E2, is configured to intake the target gas to chamber 60A and its contents from the target gas environment E1 via the inlet 62, and exchange moisture between chamber 60A and chamber 60B and their contents via vent 204, and exchange moisture between the vent or control environment E2 and chamber 60B and its contents via vent 64 to maintain the sensor electrolyte's 70 inherent ERH.

The target gas passes from the target gas environment E1 in the direction of arrow D through the exterior filter 180 to the aperture 162, through the aperture 162 to the inlet 62, through the inlet 62 to the first chamber's 60A counterbore 50, through the counterbore 50 and to and through the framework's 90 openings 108 (FIG. 6) to the filter 82, and through the filter 82 to the medium 72 in chamber 60A where the target gas contacts the sensor electrolyte 70, which oxidizes/reduces the target gas. The resulting electrochemical reaction produces an electric current that passes to the electrodes 120 via the leads 128 and to an exterior circuit when connected electrically to the connection ends 126 of the electrodes 120. In addition to measuring, amplifying, and performing other signal processing functions, the skilled person may configure the exterior circuit to maintain the voltage facing the sensor 200 between its electrodes 120 according to standard practice.

The exterior filter 180 is configured to stop particulate contaminants carried by the target gas from passing through to controller's 160 aperture 162, into the inlet 62 from the aperture 162, and into chamber 60A from the inlet 62, contaminating the first chamber's 60A contents. The size of the controller's 160 aperture 162 relative to the casing's 22 inlet 62 selectively restricts and thereby controls the flow of the target gas to the inlet 62 and into chamber 60A through the casing's 22 inlet 62 from the target gas environment E1 to prevent the medium 72 and its sensor electrolyte 70 from being overwhelmed with the target gas. Again, a user chooses the size of the controller's 160 aperture 162 relative to the casing's 22 inlet 62 to provide a desired flow of the target gas to the inlet 62 and into chamber 60A through the casing's 22 inlet 62 from the target gas environment E1. The filter 82 is configured to stop particulate contaminants carried by the target gas that may have escaped through the exterior filter 180 from passing to and contaminating the medium 72 and its sensor electrolyte 70.

The vent environment E2 is preferably enclosed/isolated from the target gas environment E1 during the use of the sensor 20, such as by the housing 190 or the like coupled to the casing 22 isolating the target gas environment E1 to the inlet 62 from the vent environment E2 to the vent 64. The vent's 204 membrane 230 between chamber 60A and chamber 60B allows only moisture exchange/transfer via vent 204 between chamber 60A and its contents and chamber 60B and its contents, disabling target gas components from passing from chamber 60A to chamber 60B contaminating it and its contents. The vent's 64 membrane 141 between the vent environment E2 and the sensor's 200 chamber 60B allows only moisture exchange/transfer via vent 64 between the vent environment E2 and chamber 60B and its contents, disabling components other than moisture from passing to and contaminating the chamber 60B and its contents from the vent environment E2. Accordingly, the membranes 141 and 230 isolate chamber 60B from all but moisture transfer.

The target gas entering the casing's 22 chamber 60A via the inlet 62 from the target gas environment E1 has the same humidity level, i.e. moisture content, as the target gas environment E1. The moisture content of the target gas environment E1 can be the same as chamber 60B and vent environment E2, higher than chamber 60B and the vent environment E2, or lower than chamber 60B and the vent environment E2. The target gas environment E1 is a high humidity environment when the moisture content of the target gas of the target gas environment E1 is greater than the moisture content of chamber 60B and the vent environment E2. The target gas environment E1 is a low humidity environment when the moisture content of the target gas of the target gas environment E1 is less than the moisture content of chamber 60B and the vent environment E2.

The operation of sensor 200 in a high humidity target gas environment E1 is as follows. Membrane 230 continually exhausts moisture through vent 204 in the direction of arrow E from chamber 60A to chamber 60B, where it passes through medium 72A to humidifier 220, which absorbs it. Membrane 141 continuously exhausts moisture released from humidifier 220 in chamber 60B through medium 72A and vent 64 in the direction of arrow E to vent environment E2. This moisture exchange between chambers 60A and 60B and between chamber 60B and vent environment E2 is due to the humidity differential between chambers 60A and 60B and between chamber 60B and vent environment E2. Membrane 230 stops all but moisture from passing through via vent 204 between chambers 60A and 60B. Membrane 141 stops all but moisture from passing through via vent 64 between chamber 60B and vent environment E2. The continual moisture exhaust from chamber 60A to humidifier 220 and from humidifier 220 to vent environment E2 constantly prevents medium 72 and sensor electrolyte 70 from absorbing the target gas moisture, constantly forestalling sensor electrolyte 70 from diluting and its inherent ERH from changing, disabling sensor electrolyte 70 from working at its nominal performance standard. The constant evacuation of moisture from humidifier 220 in chamber 60B to vent environment E2 prevents the humidifier 220 from becoming overwhelmed with excess moisture. The constant evacuation of moisture from chamber 60A to chamber 60B and from chamber 60B to vent environment E2 prevents the sensor electrolyte 70 from diluting, keeping it suitably conditioned or otherwise hydrated at its inherent ERH. Accordingly, sensor 200 is uniquely configured for long-term use in a high humidity target gas environment.

The operation of sensor 200 in a low humidity target gas environment E1 is as follows. Humidifier 220 continuously releases moisture, and membrane 230 continually supplies the released moisture from humidifier 220 to chamber 60B through vent 204 in the direction of arrow F to medium 72 and sensor electrolyte 70, which absorb it. Membrane 141 continuously supplies moisture from vent environment E2 to chamber 60B via vent 64 in the direction of arrow F, where it passes through medium 72A to humidifier 220, which absorbs it. The described moisture exchange between chambers 60A and 60B and between chamber 60B and vent environment E2 is due to the humidity differential between chambers 60A and 60B and between chamber 60B and the vent environment E2. Membrane 230 stops all but moisture from passing through via vent 204 between chambers 60A and 60B. Membrane 141 stops all but moisture from passing through via vent 64 between chamber 60B and vent environment E2. The continual moisture supply from humidifier 220 to medium 72 and sensor electrolyte 70 in chamber 60A and from vent environment E2 to humidifier 220 in chamber 60B constantly prevents medium 72 and sensor electrolyte 70 from drying, constantly forestalling sensor electrolyte 70 from concentrating and its inherent ERH from changing, disabling sensor electrolyte 70 from working at its nominal performance standard. The constant moisture supply to humidifier 220 in chamber 60B from vent environment E2 constantly keeps the humidifier 220 hydrated, enabling it to release its moisture to chamber 60A. The constant moisture supply to chamber 60A from chamber 60B and to chamber 60B from vent environment E2 prevents sensor electrolyte 70 from concentrating, keeping it suitably conditioned or otherwise hydrated at its inherent ERH. Accordingly, sensor 200 is uniquely configured for long-term use in a low humidity target gas environment.

The sensor 200 is uniquely configured to enable moisture exchange/regulation between chamber 60A and chamber 60B and between chamber 60B and the vent environment E2 in low and high humidity target gas environments for keeping the sensor electrolyte 70 in chamber 60A suitable hydrated, keeping it at its inherent ERH for enabling it to work at its nominal performance standard. The juxtaposition of the humidifier 220 in chamber 60B between chamber 60A and the vent environment E2 buffers moisture exchange between chamber 60A and the vent environment E2. When the moisture contents, i.e. the humidity levels, of the target gas environment E1, chamber 60B, and the vent environment E2 are the same, the moisture exchange between chambers 60A and 60B and between chamber 60B and the vent environment E2 via vent 64 is negligible. The moisture content of the chamber 60B can be set to selected moisture content by the humidifier 220 and the vent environment E2 can be set to a selected moisture content depending on the moisture content of the target gas environment E1. Again, the vent environment E2 can be set to a selected moisture content by one or more moisture sources.

III

Figure 10:
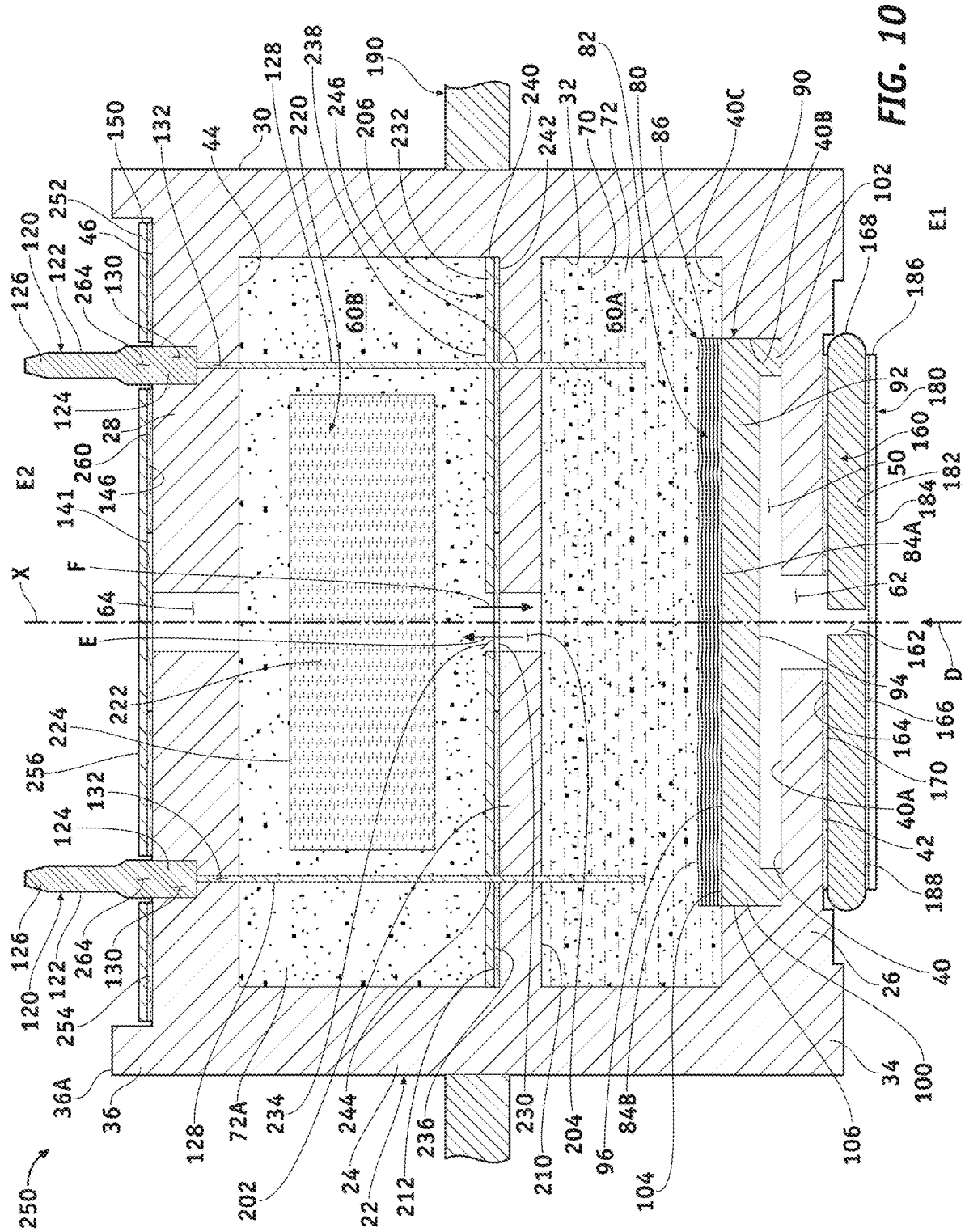
FIG. 10 is a vertical section view of yet another embodiment of a moisture regulating electrochemical sensor constructed and arranged according to the invention.

FIG. 10 is a vertical section view like FIG. 9, illustrating yet another embodiment of a moisture regulating electrochemical sensor 250 constructed and arranged according to the invention. The sensor 250 is identical in every respect to sensor 200 and its described operation, and the same reference numerals are used for reference purposes, except that the sensor's 250 vent 64 is, unlike sensor 200, closed and sealed by a closure 252, disabling fluid exchange between an exterior environment and chamber 60B. Accordingly, the sensor's 250 top wall 28 is a closed wall. The sensor 250 enables moisture exchange between the humidifier 220 in chamber 60B and the medium 72 and the sensor electrolyte 70 in chamber 60A and does not enable moisture exchange between an exterior environment and chamber 60B and its contents.

The closure 252 is a rugged disk-shaped sheet or layer of a fluid-impervious material, such as plastic, over the vent 64 and secured to the top wall's 28 exterior surface 46. The closure 252 includes an inner surface 254, an outer surface 256, and a perimeter edge 258. The closure 252 extends radially outward over the top wall's 28 exterior surface 46 from over the vent 64 to the electrodes 120 and beyond the electrodes 120 to the perimeter edge 258 adjacent to the annular rim 36A. The closure's 252 axial thickness extends to its outer surface 256 from its inner surface 254 facing the exterior surface 46. The inner surface 254 is covered by a layer 260 of a suitable adhesive. The layer 260 releasably adheres and seals the inner surface 254 to the exterior surface 46, sealing the closure 252 to the exterior surface 46 and over the vent 64 closing it, disabling fluid transfer through the vent 64 between chamber 60B and the exterior environment. Each electrode 120 extends outwardly from top wall's 28 exterior surface 46 and through and beyond an opening 264 concurrently extending through the thicknesses of the layer 258 of adhesive and the closure 252 to its connection end 126.

Like the sensor 200, the sensor 250 is configured for long-term use in low and high humidity target gas environments to measure the given target gas concentration by oxidizing or reducing it by the sensor electrolyte 70 in chamber 60A and measuring the resulting current applied to the electrodes 120, forestall moisture uptake by the sensor electrolyte 70 in high humidity target gas environments and dehydration of the sensor electrolyte 70 in low humidity target gas environments to maintain the sensor electrolyte's 70 inherent ERH enabling the sensor electrolyte 70 to continually operate at its nominal performance standard. The sensor 250, coupled to the target gas environment E1, is configured to intake the target gas to chamber 60A and its contents from the target gas environment E1 via the inlet 62, and exchange moisture between chamber 60A and chamber 60B and their contents via vent 204 to maintain the sensor electrolyte's 70 inherent ERH.

The target gas entering the casing's 22 chamber 60A via the inlet 62 from the target gas environment E1 has the same humidity level, i.e. moisture content, as the target gas environment E1. The moisture content of the target gas environment E1 can be the same as chamber 60B, higher than chamber 60B, or lower than chamber 60B. The target gas environment E1 is a high humidity environment when the moisture content of the target gas of the target gas environment E1 is greater than the moisture content of chamber 60B. The target gas environment E1 is a low humidity environment when the moisture content of the target gas of the target gas environment E1 is less than the moisture content of chamber 60B.

The operation of sensor 250 in a high humidity target gas environment E1 is as follows. Membrane 230 continually exhausts moisture through vent 204 in the direction of arrow E from chamber 60A to chamber 60B, where it passes through medium 72A to humidifier 220, which absorbs it. This moisture exchange between chambers 60A and 60B is due to the humidity differential between chambers 60A and 60B. Membrane 230 stops all but moisture from passing through via vent 204 between chambers 60A and 60B. The continual moisture exhaust from chamber 60A to humidifier 220 constantly prevents medium 72 and sensor electrolyte 70 from absorbing the target gas moisture, constantly forestalling sensor electrolyte 70 from diluting and its inherent ERH from changing, disabling sensor electrolyte 70 from working at its nominal performance standard. The constant evacuation of moisture from chamber 60A to chamber 60B prevents the sensor electrolyte 70 from diluting, keeping it suitably conditioned or otherwise hydrated at its inherent ERH. Accordingly, sensor 250 is uniquely configured for long-term use in a high humidity target gas environment.

The operation of sensor 250 in a low humidity target gas environment E1 is as follows. Humidifier 220 continuously releases moisture, and membrane 230 continually supplies the released moisture from humidifier 220 to chamber 60B through vent 204 in the direction of arrow F to medium 72 and sensor electrolyte 70, which absorb it. The described moisture exchange between chambers 60A and 60B is due to the humidity differential between chambers 60A and 60B. Membrane 230 stops all but moisture from passing through via vent 204 between chambers 60A and 60B. The continual moisture supply from humidifier 220 to medium 72 and sensor electrolyte 70 in chamber 60A constantly prevents medium 72 and sensor electrolyte 70 from drying, constantly forestalling sensor electrolyte 70 from concentrating and its inherent ERH from changing, disabling sensor electrolyte 70 from working at its nominal performance standard. The constant moisture supply to chamber 60A from chamber 60B prevents sensor electrolyte 70 from concentrating, keeping it suitably conditioned or otherwise hydrated at its inherent ERH. Accordingly, sensor 250 is uniquely configured for long-term use in a low humidity target gas environment. The chamber 60B of sensor 250 serves as sensor's 250 self-contained vent environment.

The sensor 250 is uniquely configured to enable moisture exchange/regulation between chamber 60A and chamber 60B in low and high humidity target gas environments for keeping the sensor electrolyte 70 in chamber 60A suitable hydrated, keeping it at its inherent ERH for enabling it to work at its nominal performance standard. The exterior application of the closure 252 to the top wall's 28 exterior surface 46 enables a user to peel the closure 252 away from the exterior surface 46, hydrate or dehydrate the humidifier 220 through the now open vent 64 as needed, and reinstall the closure 252 or replace it with a new one to reclose the vent 64. Threaded closures, snap closures, plug closures, or the like can be used to releasably close the vent 64 in alternate embodiments. Since the casings 22 of the sensors 200 and 250 are identical, a user may exchange sensor's 200 membraned carrier 140 with sensor's 250 closure 252 and vice versa. When the moisture contents, i.e. the humidity levels, of the target gas environment E1 and chamber 60B are the same, the moisture exchange between chambers 60A and 60B is negligible. The moisture content of the chamber 60B can be set to selected moisture content by the humidifier 220 depending on the moisture content of the target gas environment E1.

IV

The present invention is described above with reference to illustrative embodiments. Those skilled in the art will recognize that changes and modifications may be made in the described embodiments without departing from the nature and scope of the present invention. For instance, one or more humidity sensors may be deployed to sense humidity levels in the target/vent environments to determine the operational characteristics of the sensors. Various further changes and modifications to the embodiments herein chosen for purposes of illustration will readily occur to those skilled in the art. To the extent that such modifications and variations do not depart from the invention, they are intended to be included within the scope thereof.

Having fully described the invention in such clear and concise terms as to enable those skilled in the art to understand and practice the same, the invention claimed is:

1. A moisture regulating electrochemical sensor, comprising:
   a sensor electrolyte carried by an absorbent medium housed in a chamber of a casing configured with electrodes each connected electrically to the sensor electrolyte by a lead extending into the absorbent medium and configured to be connected electrically to an exterior circuit, an inlet, a vent, and a membrane, the chamber between the inlet and the vent;
   the inlet allowing a target gas to pass through to the sensor electrolyte in the chamber from an exterior target gas environment; and
   the membrane operatively coupled to the vent and permeable only to moisture to allow only moisture to pass through the vent between an exterior vent environment and the sensor electrolyte in the chamber and stop the target gas from passing through the vent to and contaminating the exterior vent environment from the sensor electrolyte in the chamber.

2. The moisture regulating electrochemical sensor according to claim 1, further comprising the membrane carried by a carrier attached to the casing.

3. The moisture regulating electrochemical sensor according to claim 2, further comprising the carrier extending radially outward over a surface of the casing from the membrane, the carrier sealed to the surface of the casing by an adhesive.

4. The moisture regulating electrochemical sensor according to claim 3, further comprising the membrane outside the chamber and over the vent, the carrier outside the chamber, and the surface of the casing comprising an exterior surface of the casing.

5. The moisture regulating electrochemical sensor according to claim 4, further comprising the electrodes each extending outwardly from the exterior surface of the casing and through and beyond an opening through the carrier.

6. The moisture regulating electrochemical sensor according to claim 1, further comprising the inlet configured with a target gas flow controller configured to control a flow of the target gas to the inlet.

7. The moisture regulating electrochemical sensor according to claim 6, further comprising:
   the inlet including a first size;
   the target gas flow controller comprising a body including an inner surface, an outer surface, and an aperture extending through the body from the inner surface to the outer surface, the body extending radially outward over an exterior surface of the casing from the aperture registered with the inlet, and outward from the inner surface, sealed to the exterior surface of the casing by an adhesive, to the outer surface; and
   the aperture including a second size smaller than the first size of the inlet.

8. The moisture regulating electrochemical sensor according to claim 7, wherein the inlet, the vent, and the aperture are coaxial.

9. The moisture regulating electrochemical sensor according to claim 7, further comprising an exterior filter attached to the outer surface of the body, the exterior filter extending over the aperture, permeable to the target gas, and configured to stop solid particulates carried by the target gas from passing through from the target gas environment to the aperture.

10. The moisture regulating electrochemical sensor according to claim 9, further comprising the exterior filter extending radially outward over the outer surface of the body from the aperture to a continuous layer of adhesive, sealing the exterior filter to the outer surface of the body.

11. The moisture regulating electrochemical sensor according to claim 1, the absorbent medium comprising a wadding of cellulose.

12. The moisture regulating electrochemical sensor according to claim 1, further comprising an interior filter in the chamber between the inlet and the sensor electrolyte, the interior filter permeable to the target gas and configured to stop solid particulates carried by the target gas from passing through from the inlet to the sensor electrolyte.

13. The moisture regulating electrochemical sensor according to claim 12, further comprising the interior filter supported by a framework in the chamber, the framework coupled between the interior filter and the casing, and the interior filter open to the inlet through the framework.

14. The moisture regulating electrochemical sensor according to claim 12, further comprising the absorbent medium directly contacting the interior filter.

15. A moisture regulating electrochemical sensor, comprising:
   a sensor electrolyte carried by an absorbent medium housed in a chamber of a casing configured with electrodes each connected electrically to the sensor electrolyte and configured to be connected electrically to an exterior circuit, an inlet, a vent, and a membrane, the chamber between the inlet and the vent;
   the inlet allowing a target gas to pass through to the sensor electrolyte in the chamber from an exterior target gas environment;
   the membrane operatively coupled to the vent and permeable only to moisture to allow only moisture to pass through the vent between an exterior vent environment and the sensor electrolyte in the chamber and stop the target gas from passing through the vent to and contaminating the exterior vent environment from the sensor electrolyte in the chamber; and
   an interior filter in the chamber between the inlet and the sensor electrolyte, the interior filter permeable to the target gas and configured to stop solid particulates carried by the target gas from passing through from the inlet to the sensor electrolyte carried by the absorbent medium directly contacting the interior filter.

16. The moisture regulating electrochemical sensor according to claim 15, further comprising the membrane carried by a carrier attached to the casing.

17. The moisture regulating electrochemical sensor according to claim 16, further comprising the carrier extending radially outward over a surface of the casing from the membrane, the carrier sealed to the surface of the casing by an adhesive.

18. The moisture regulating electrochemical sensor according to claim 17, further comprising the membrane outside the chamber and over the vent, the carrier outside the chamber, and the surface of the casing comprising an exterior surface of the casing.

19. The moisture regulating electrochemical electrode according to claim 18, further comprising the electrodes each connected electrically to the sensor electrolyte by a lead and extending outwardly from the exterior surface of the casing and through and beyond an opening through the carrier.

20. The moisture regulating electrochemical sensor according to claim 15, further comprising the inlet configured with a target gas flow controller configured to control a flow of the target gas to the inlet.

21. The moisture regulating electrochemical sensor according to claim 20, further comprising:
the inlet including a first size;
the target gas flow controller comprising a body including an inner surface, an outer surface, and an aperture extending through the body from the inner surface to the outer surface, the body extending radially outward over an exterior surface of the casing from the aperture registered with the inlet, and outward from the inner surface, sealed to the exterior surface of the casing by an adhesive, to the outer surface; and
the aperture including a second size smaller than the first size of the inlet.

22. The moisture regulating electrochemical sensor according to claim 21, wherein the inlet, the vent, and the aperture are coaxial.

23. The moisture regulating electrochemical sensor according to claim 21, further comprising an exterior filter attached to the outer surface of the body, the exterior filter extending over the aperture, permeable to the target gas, and configured to stop solid particulates carried by the target gas from passing through from the target gas environment to the aperture.

24. The moisture regulating electrochemical sensor according to claim 23, further comprising the exterior filter extending radially outward over the outer surface of the body from the aperture to a continuous layer of adhesive, sealing the exterior filter to the outer surface of the body.

25. The moisture regulating electrochemical sensor according to claim 15, further comprising the electrodes each connected electrically to the sensor electrolyte by a lead extending into the absorbent medium.

26. The moisture regulating electrochemical sensor according to claim 15, the absorbent medium comprising a wadding of cellulose.

27. The moisture regulating electrochemical sensor according to claim 15, further comprising the interior filter supported by a framework in the chamber, the framework coupled between the interior filter and the casing, and the interior filter open to the inlet through the framework.

* * * * *